(12) United States Patent
Fallavollita (10) Patent No.: US 8,354,088 B2
(45) Date of Patent: Jan. 15, 2013

(54) METHODS AND APPARATUS FOR RECOVERY OF SILICON AND SILICON CARBIDE FROM SPENT WAFER-SAWING SLURRY

(75) Inventor: John Allan Fallavollita, Edmonton (CA)

(73) Assignee: Iosil Energy Corporation, Groveport, OH (US)

( * ) Notice: Subject to any disclaimer, the term of this patent is extended or adjusted under 35 U.S.C. 154(b) by 0 days.

(21) Appl. No.: 13/175,802

(22) Filed: Jul. 1, 2011

(65) Prior Publication Data
US 2011/0280785 A1 Nov. 17, 2011

Related U.S. Application Data

(63) Continuation of application No. 12/865,989, filed as application No. PCT/US2009/040261 on Apr. 10, 2009.

(60) Provisional application No. 61/044,342, filed on Apr. 11, 2008, provisional application No. 61/148,033, filed on Jan. 28, 2009.

(51) Int. Cl.
*C01B 33/02* (2006.01)

(52) U.S. Cl. ........ 423/349; 423/348; 423/335; 423/336; 423/337; 423/338; 423/339; 423/340; 423/350; 423/341; 423/342; 423/343; 423/344; 423/345; 423/346; 423/347; 209/10; 209/3

(58) Field of Classification Search .......... None
See application file for complete search history.

(56) References Cited

U.S. PATENT DOCUMENTS

| | | | |
|---|---|---|---|
| 4,092,446 A | 5/1978 | Padovani et al. |
| 4,207,360 A | 6/1980 | Padovani et al. |
| 4,213,937 A | 7/1980 | Padovani et al. |
| 4,307,242 A | 12/1981 | Shah et al. |
| 4,340,574 A | 7/1982 | Coleman |
| 4,388,286 A | 6/1983 | Kapur et al. |
| 4,519,999 A | 5/1985 | Coleman et al. |
| 4,642,227 A | 2/1987 | Flagan et al. |
| 4,981,668 A | 1/1991 | Dosaj et al. |

(Continued)

FOREIGN PATENT DOCUMENTS

JP 6-87607 A 3/1994

(Continued)

OTHER PUBLICATIONS

Ciszek, et al. Alternative Solar-Grade Silicon Feedstock Approaches. National Renewable Energy Laboratory. Oct. 2001;NREL/CP-520-31007.

(Continued)

*Primary Examiner* — Patricia L Hailey
*Assistant Examiner* — Smita Patel
(74) *Attorney, Agent, or Firm* — Wilson Sonsini Goodrich & Rosati (57) ABSTRACT

Methods, systems, and apparatus are disclosed herein for recovery of high-purity silicon, silicon carbide and PEG from a slurry produced during a wafer cutting process. A silicon-containing material can be processed for production of a silicon-rich composition. Silicon carbide and PEG recovered from the silicon-containing material can be used to form a wafer-saw cutting fluid. The silicon-rich composition can be reacted with iodine containing compounds that can be purified and/or used to form deposited silicon of high purity. The produced silicon can be used in the photovoltaic industry or semiconductor industry.

2 Claims, 2 Drawing Sheets

U.S. PATENT DOCUMENTS

| | | | |
|---|---|---|---|
| 5,798,137 A | 8/1998 | Lord et al. | |
| 6,113,473 A | 9/2000 | Costantini et al. | |
| 6,281,098 B1 | 8/2001 | Wang et al. | |
| 6,322,710 B1 | 11/2001 | Katsumata et al. | |
| 6,468,886 B2 | 10/2002 | Wang et al. | |
| 6,615,817 B2 | 9/2003 | Horio | |
| 6,702,994 B1 | 3/2004 | Henriksen et al. | |
| 6,712,908 B2 * | 3/2004 | Wang et al. | 118/719 |
| 6,780,665 B2 * | 8/2004 | Billiet et al. | 438/57 |
| 6,827,786 B2 | 12/2004 | Lord | |
| 6,838,047 B2 | 1/2005 | Billiet et al. | |
| 6,915,796 B2 | 7/2005 | Sung | |
| 6,929,537 B2 | 8/2005 | Kajimoto | |
| 2002/0081250 A1 | 6/2002 | Lord | |
| 2003/0220055 A1 | 11/2003 | Kajimoto | |
| 2007/0178807 A1 | 8/2007 | Gupta et al. | |
| 2008/0044337 A1 | 2/2008 | Fallavollita | |
| 2008/0223351 A1 | 9/2008 | Morikawa et al. | |
| 2010/0163462 A1 | 7/2010 | Grabbe et al. | |
| 2011/0059002 A1 | 3/2011 | Fallavollita | |

FOREIGN PATENT DOCUMENTS

| | | |
|---|---|---|
| JP | 2000-191312 A | 7/2000 |
| JP | 2001-278612 A | 10/2001 |
| JP | 2008-290897 A | 12/2008 |
| WO | WO 02/40407 A1 | 5/2002 |
| WO | WO 2006/137098 A1 | 12/2006 |
| WO | WO 2008/022348 A2 | 2/2008 |
| WO | WO 2008/022348 A3 | 4/2008 |
| WO | WO 2009/126922 A2 | 10/2009 |
| WO | WO 2009/126922 A3 | 3/2010 |

OTHER PUBLICATIONS

Wang, et al. Atmospheric Pressure Iodine Vapor Transport for Thin Silicon Growth. National Renewable Energy Laboratory. Oct. 2001;NREL/CP-520-31006.

Wang, et al. Growth of Large-Grain Silicon Layers by Atmospheric Iodine Vapor Transport. Journal of the Electrochemical Society. 2000;147(5):1945-1949.

* cited by examiner

METHODS AND APPARATUS FOR RECOVERY OF SILICON AND SILICON CARBIDE FROM SPENT WAFER-SAWING SLURRY

CROSS REFERENCE TO RELATED APPLICATIONS

This application is a continuation of U.S. patent application Ser. No. 12/865,989, filed Nov. 24, 2010, which is a national stage entry of PCT/US09/40261, filed Apr. 10, 2009, which claims priority to U.S. Provisional Application No. 61/044,342, filed Apr. 11, 2008, and U.S. Provisional Application No. 61/148,033, filed Jan. 28, 2009, which are each incorporated herein by reference in their entirety.

FIELD OF INVENTION

The invention relates to methods and systems for recovering silicon and silicon-containing compounds from spent slurry that is generated during wafer cutting or sawing operations in the microelectronic (ME) and photovoltaic (PV) industries. The invention relates to methods and systems that can produce a variety of useful products, including granular silicon products of high or increased purity. The products, such as granular silicon products of high or increased purity, can be suitable for multi-crystalline ingot casting or replacing electronic grade silicon (EG-Si) for single-crystal production in PV applications, and/or high-efficiency single-crystal solar cells. Other products can include fine silicon carbide abrasive powders and an associated carrier liquid for reuse in the wafer sawing process.

BACKGROUND OF THE INVENTION

The market demand for solar energy collection systems in the form of photovoltaic (PV) cells is growing in excess of 25% per year globally due to factors including higher oil prices and government policies addressing such environmental issues as global warming. The dominant substrate material for PV is silicon, which accounts for about 90% of installed commercial units at the present time. A serious shortcoming in the silicon-based PV value chain, however, is that there is a loss of around 40-50% of the silicon during the wafer cutting process. This situation also exists in the interconnected microelectronics (ME) silicon value chain.

The current process for developing a PV cell is a multi-step chain of value-added activities, transforming basic silicon into a power-generating device. With each step, silicon is refined and shaped to enable placement into a solar cell. However, this value chain is not without inefficiencies. During the critical step where silicon ingots are sawed into thin wafers, roughly 40% of the original ingot ends up as spent (or waste) kerf slurry resulting from the most prevalent steel-wire-saw technology using SiC powder in polyethylene glycol (PEG 200).

The spent slurry product from the wafer cutting process generally consists of very fine solid particles within a liquid phase. The solid particles are irregular shaped and consist mostly of silicon carbide of between 15-20 micrometers effective diameter. The remaining particles are from the steel wire saw and silicon wafer. The steel particles may be associated with the silicon carbide particles and are generally less than 2-4 micrometers in effective diameter. The silicon particles are generally free of silicon carbide and in the particle size range of 1-2 micrometers. During the wire sawing operation the silicon carbide starting material is slightly abraded and smaller particles in the range of 5-10 micrometers are formed over time.

Therefore, while a raw material silicon shortage exists today for the PV industry that is driving prices toward the electronic-grade silicon (EG-Si) level, about half of all silicon produced for the ME and PV industries is being landfilled.

Although the silicon particles lost during this step are of the same purity as the original ingot, there exist no commercially viable technologies to recover and reuse this silicon. The main reason for this state of art is that the spent slurry can be a very complex, colloidal mixture of extremely small particles in the range of 0.1 to 30 μm—with the silicon portion being less than about 2-5 μm in effective diameter (comparable to the size of bacteria). Efforts to physically separate these silicon particles from the mixture are severely hampered by wire-saw particle impurities (mostly iron, copper, and zinc) that prevent the attainment of the original ingot purity. Even if it were possible to completely remove the wire-saw particles from the slurry by physical means, the remaining ultrafine silicon powder is both dangerous to handle (due to potential dust explosions) and extremely difficult to melt using conventional furnace technology.

The effect of this market need on the overall economics of the PV industry is significant. It has been well-documented that the solar industry has suffered from a major silicon feedstock shortage since 2005.[1] During these past 4 years, more than 40% of the >100,000 tonnes of silicon produced during this timeframe was discarded due to the inability to recycle polysilicon. This inefficient use of a critical PV cell building block resulted in a cumulative economic loss to the solar industry of at least $2 Billion over the period 2005-2008.[2] Moreover, given that the cost of silicon feedstock comprises almost 20% of a PV cell's total cost[3], discarding approximately 40% of the feedstock has been an important contributor to the economics preventing grid-parity and broader adoption of PV cells.

[1]Travis Bradford, "Polysilicon: Supply, Demand & Implications for the PV Industry," *Greentech In Detail*, (Jun. 25 2008) [Prometheus Institute], Pg. 24.
[2]During 2005-2008 period, average polysilicon production for PV was 25K tonnes.'yr., and avenge contract price was $50/kg.
[3]Bradford, "Polysilicon: Supply, Demand & Implications for the PV Industry," *Greentech In Detail*, (Jun. 25, 2008) [Prometheus Institute], Pg. 29.

Therefore, there is a need to recover silicon in a form and purity suitable for reuse within the silicon-wafer based PV industry. U.S. Provisional Patent Application No. 61/044,342, filed Apr. 11, 2008, incorporated herein by reference in its entirety, describes a multistep process for recovering silicon granules from spent wafer-sawing operations. The process described therein can include a 2-stage iodine-catalysed reaction sequence that can operate at temperatures between 800-1300° C. to produce a granular silicon product. The purity of silicon recovered can reach 99.9999 wt % (i.e., 6 nines or 6N) and possibly higher levels under certain operating conditions.

However, for the highest efficiency PV cells in use today it may be preferable to utilize a higher-purity silicon. For instance, it may be desirable to obtain a silicon purity of 8N (i.e., 99.999999 wt %).

Therefore, there remains a aced in the art for commercial operations that can efficiently separate the silicon particles from the remainder of the slurry mixture. Furthermore, there exists a need for ways of converting these fine silicon particles into a useable form for application in the commercial production of semiconductor devices such as photovoltaic solar cells. Also, there remains a need in the an for commercial operations that can recover and/or purify silicon to increased purities (e.g., 8N) from various sources, such as the spent wafer-sawing slurry produced in the PV and ME industries.

SUMMARY OF THE INVENTION

The invention provides methods, systems, and apparatus for generating and/or recovering one or more silicon-containing products from spent silicon wafer wire sawing slurry. Varying grades of high or increased purity silicon (i.e., up to 7N to 10N and higher) can be produced at high throughputs and low or competitive cost with the processes and apparatus disclosed herein. Various aspects of the invention described herein may be applied to any of the particular applications set forth below or for any other types of silicon purifying applications. The invention may be applied as a standalone system or method, or as part of an integrated silicon product manufacturing process. It shall be understood that different aspects of the invention can be appreciated individually, collectively, or in combination with each other.

Disclosed herein are methods and apparatus for the production of polycrystalline silicon granules and recovery of silicon carbide particles from various sources. The various sources can be spent slurry such as those generated during wire-sawing processes used in the microelectronics (ME) and photovoltaic (PV) industries.

Some embodiments of the invention provide purification systems and methods that can perform one or more of the following: (1) separation of wire-saw steel particles from the slurry using one or more series of physical separation devices (for example, magnets or electromagnets); (2) recovery of the slurry product and subsequent removal of the liquid phase (either glycol-water or oil) to produce a moist fine powder mixture of silicon carbide and silicon; (3) complete removal of the remaining moisture or oil using a liquid-to-gas phase separation of the powder mixture that can form a dry mixture of silicon and silicon carbide; (4) subjecting a dry mixture of silicon and silicon carbide to a high temperature reactor containing pure silicon tetra-iodide to produce a vapor containing silicon di-iodide; (5) separating the silicon carbide by gravity or filter devices from the vapor stream thus created; (6) conducting the vapor phase to a second vessel that is preferably a fluidized bed with substantially lower temperature and depositing pure silicon onto granules in said reactor; and (7) recycling and purifying silicon tetra-iodide in a distillation column or other device to remove any impurities. These methods and processes can be combined, switched, or modified with any other methods or processes described herein for the recovery and production of silicon, silicon carbide, and PEG from a wafer-sawing process. The methods and processes for recovering silicon, silicon carbide, and PEG can be implemented in any order.

Other embodiments of the invention provide purification systems and methods, which can be used to produce high purity silicon, that can perform one or more of the following: (1) separation of large silicon carbide particles (e.g., particles greater than 5 micrometers in effective diameter) by means of gravity separation methods with or without the aid of centrifugal forces of different magnitude (e.g., settling tank, clarifier, hydro-cyclone, centrifuge, filter, and hydraulic classifier that uses additional convective flow to effect separation); (2) removal of wire-saw steel particles from the slurry using one or more series of magnetic separation devices (e.g., magnets or electromagnets); (3) performing leaching, e.g., by reacting the steel-depleted shiny with an acidic solution so as to further reduce the content of steel; (4) removal of a liquid phase (e.g., PEG) to produce a moist fine powder mixture (e.g., less than 5 percent liquid) of enriched-silicon with only minor amounts of steel and smaller-sized (e.g., less than 5 micrometers in effective diameter) silicon carbide particles; (5) drying of the remaining solids to effect virtually complete removal of liquid; (6) subjecting said dry mixture of enriched-silicon to a heated reactor containing pure iodine vapor at between about 600-800° C. to produce a vapor containing mostly silicon tetra-iodide and only a very small amount of impurity iodides; (7) cooling the vapor phase and conducting it to a purification unit that is preferably a distillation column to remove impurities in the silicon tetra-iodide; (8) collecting the purified silicon tetra-iodide and then subjecting it to temperatures in the range of about 800-1300° C. in a fluidized bed operating under vacuum whereupon the silicon tetra-iodide is decomposed into pure silicon and iodide vapor; and (9) recycling the iodine vapor to the process. These methods and processes can he combined, switched, or modified with any other methods or processes described herein for the recovery and production of silicon, silicon carbide, and PEG from a wafer-sawing process. The methods and processes for recovering silicon, silicon carbide, and PEG can be implemented in any order.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

BRIEF DESCRIPTION OF THE DRAWINGS

The novel features of the invention are bet forth with particularity in the appended claims. A better understanding of the features and advantages of the present invention will be obtained by reference to the following detailed description that sets forth illustrative embodiments, in which the principles of the invention are utilized, and the accompanying drawings of which:

INCORPORATION BY REFERENCE

All publications and patent applications mentioned in this specification arc herein incorporated by reference to the same extent as if each individual publication or patent application was specifically and individually indicated to be incorporated by reference.

DETAILED DESCRIPTION OF THE INVENTION

The invention provides methods and systems for recovering silicon, silicon carbide, and cutting fluids, for producing high purity silicon from spent slurry generated in various industrial processes. In particular, the invention may be applied to spent slurry from wafer-cutting operations in the microelectronics and photovoltaic industries.

In an embodiment, the invention further provides processes that are scalable to commercial capacity (for example, 50-5,000 or 500-5,000 tonne per year) for producing silicon suitable for use in the photovoltaic industry.

In an aspect of the invention, economical, high through-put methods of depositing pure silicon granules are provided that are useful for applications in the continuous processes of leading PV manufacturers using string ribbon or spherical cells.

In an aspect, an apparatus is disclosed that produces pure granular silicon feedstock and silicon carbide powder. In an embodiment, an apparatus comprises a system for recovering the slurry liquid medium for reuse in the wafer cutting process.

In another aspect, a system, method or apparatus of the invention can recover at least 60%, 70%, 80%, 85%, 90%, 95%, or 99% of the silicon contained in a silicon-cutting slurry or a waste slurry from an ingot cutting process. In an embodiment, 90% or more of the silicon is recovered. The silicon can have a purity of at least or at least about 99.9999%, 99.99999%, 99.999999%, 99.9999999%, 99.99999999%, or 99.999999999%. In other words, the silicon may have a purity up to or greater than 6N, 7N, 8N, 9N, 10N, or 11N.

Figure 1:
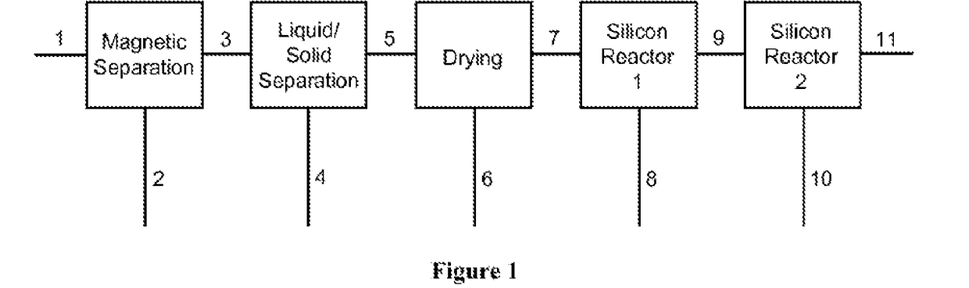
FIG. 1 is a schematic diagram of the apparatus illustrating the flow of materials for the commercial production of silicon and recovery of silicon carbide from a spent wafer cutting slurry.

As shown in FIG. 1, the systems, methods, and apparatus of the invention can comprise one or more separation steps (between streams 1 and 7) configured to process a silicon-containing input material (stream 1) to a silicon-rich stream (stream 7). These separation steps can include any of the following separations: magnetic, solid/liquid, solid/gas, gas/liquid, density, sedimentation velocity, drying, or leaching. As shown in FIG. 1, these separation steps can be used to recover or remove metals, silicon carbides, liquids, for example PEG, water, or oil, from the silicon-containing input material in various output streams, e.g., streams 2, 4, and 6. These streams can be metals-rich streams (stream 2 in FIG. 1) and silicon carbide-rich streams (stream 3a and 7a in FIG. 2).

The silicon-rich stream can be processed using any of the systems, methods, or apparatus described herein. In some embodiments of the invention, the silicon-rich stream can be reacted with silicon tetra-iodide to produce a silicon di-iodide rich stream in a first reactor (Silicon Reactor 1 in FIG. 1). The silicon di-iodide rich stream can then be used to form deposited silicon in a second reactor (Silicon Reactor 2 in FIG. 1).

Figure 3:
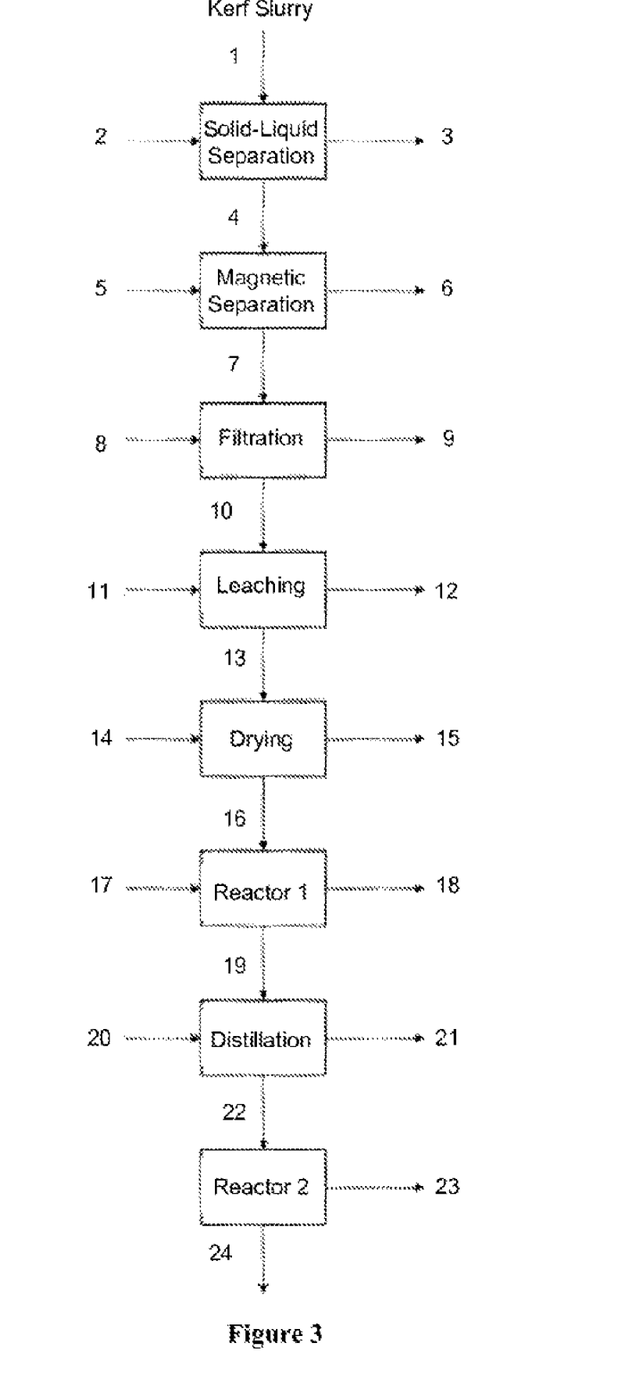
FIG. 3 is a schematic diagram of an exemplary apparatus provided in accordance with the invention illustrating the flow of materials for the recovery of silicon, silicon carbide and PEG (polyethylene glycol) from a spent wafer cutting slurry and the production of high or increased purity silicon.

In other embodiments of the invention, the silicon-rich stream can be reacted with iodine to produce a silicon tetra-iodide rich stream in a first reactor (Reactor 1 in FIG. 3). The silicon tetra-iodide rich stream can be purified to form a high-purity silicon tetra-iodide rich stream. For example, the silicon tetra-iodide rich stream can be purified using a using a distillation process (Distillation in FIG. 3). The high-purity silicon tetra-iodide rich stream can be used to form deposited silicon by reacting the purified to form silicon di-iodide in a second reactor (Reactor 2 in FIG. 3).

Recovery of High Purity Silicon

Some aspects of the invention provide methods of producing pure granular silicon feedstock by continuously feeding a spent-slurry from a wafer cutting process into a first unit wherein the steel particles from the slurry are substantially removed from the slurry by means of a physical separator. In an embodiment, the physical separator is a magnetic separator. The physical separator can be any system that exploits the physical property difference between iron-containing materials (for example, steel) and the other slurry components. The iron-containing particles can be sent to a recycling facility for substantial recovery of steel. The iron-free slurry can be subjected to liquid-solid separation steps that remove the liquid phase (either glycol-water or oil) for reuse in the wafer cutting process. Iron-free slurry can refer to slurry that has been subjected to a physical separator for removing iron-containing particles. Iron-free slurry can also refer to slurry that is completely, substantially, mostly, or somewhat free of iron-containing particles.

A moist powder product from a method described herein can be dried to remove all of the remaining liquid (for example, glycol, water or oil). A drying step generally utilizes a moderate heating of the material and/or reduction in pressure to effect the desired removal of adhering liquid. In some embodiments, a dry powder product comprises silicon and silicon carbide particles of sizes ranging from about 1 to 20 micrometers.

In one embodiment of the invention, the powder mixture is subjected to a temperature of about 1250° C. and a gas phase including some silicon tetra-iodide vapor. The powder Mixture can be subjected to temperatures of a range of about 1000 to about 1500° C., wherein the silicon portion may be in either a solid or a liquid form. Given enough residence time (for example, about 1 minute) the silicon powder reacts with the iodide vapor to produce substantial quantities of silicon di-iodide in the vapor phase. For example, a residence time can be from about 5 seconds to about 10 minutes. In an embodiment where a process is carried out in a series of reactors including a cyclone or a porous ceramic filter, silicon carbide particles typically are removed from the process. In another embodiment, silicon di-iodide vapor is transported to another reactor that is held at a temperature around 700-1000° C. In this vessel, for example a fluidized bed containing silicon seed particles such as vessels disclosed in co-owned U.S. patent application Ser. No. 11/893,980, which is incorporated by reference herein in its entirety, the silicon di-iodide can be substantially converted back to silicon with a purity similar to or about matching that of the original silicon ingot used in the wafer cutting process. Any remaining silicon tetra-iodide vapor can be therefore re-circulated in the process. Silicon tetra-iodide vapor can also be periodically cleaned of any impurities by distillation and/or other methods including a solvent. In sonic embodiments of the invention, the silicon tetra-iodide vapor is continuously purified using a distillation process or other separation process to increase the purity of the deposited silicon up to or greater than 6N, 7N, 8N, 9N, 10N, or 11N.

High Purity Silicon Iodides

In some embodiments of the invention, silicon and other materials from the spent slurry are reacted with iodine to form silicon tetra-iodide and other iodides. The iodides, including the silicon tetra-iodide, can be separated from other iodides by a variety of separation processes such as distillation, membrane separations, chromatography, and other methods known to one skilled in the art. In some embodiments of the invention, the silicon tetra-iodide can be separated from other components using, one or more separation processes, including distillation-based, temperature-based, or phase-based (e.g. solid/liquid, liquid/gas, solid/liquid/gas, and/or solid/gas) separation processes at low-pressure or vacuum. Crystallization, precipitation, and other methods known to one skilled in the art can be used to separate or increase the purity of the silicon tetra-iodide. The rate, pressure, and temperature of the separation processes can be optimized to increase the purity of the silicon tetra-iodide and/or reduce corrosion or deterioration of the apparatus for performing the separation processes. The purity of the silicon tetra-iodide recovered after the one or more separation processes can be at least or at least about 70; 80, 90, 95, 97, 99, 99.9%, 99.99%, 99.999%, 99.9999%, 99.99999%, 99.999999%, 99.9999999%, or 99.99999999%. The lifetime for the apparatus provided herein for performing the one or more separation processes, e.g., a distillation column or any other distillation device used for separation silicon tetra-iodide, can be extended for decades or extended periods of time. This can be performed by optimization of the one or more separation processes.

Examples of a distillation process used to increase the purity of silicon tetra-iodide are described in U.S. Pat. No. 6,712,908, herein incorporated by reference in its entirety. Briefly, $SiI_4$ can be separated from other iodides using a distillation process. The other iodides can include $BI_3$, $PI_3$, $Cl_4$, $FeI_2$, and $AlI_3$ may be separated from $BI_3$, $PI_3$, $Cl_4$, and $SiI_4$ in a vaporization step due to the lower relative vapor pressure of $FeI_2$ and $AlI_3$, Once vaporized, $SiI_4$ may condense at a higher temperature than $BI_3$ and $PI_3$, and at a lower temperature than $Cl_4$.

Recovery of SiC

In another embodiment of the invention the silicon carbide particles in the slurry are separated into two fractions, one containing mostly larger particles (for example, about 10-20 micrometer particles) and the other containing the fraction of silicon carbide particles that are produced during wire cutting and possessing a smaller particle size (for example, about 1-10 micrometers). For example, a separation step can be implemented using a hydro-cyclone either after the physical separation step (for example, using a magnet) or in an air-cyclone of appropriate geometry after the drying step. Either type of cyclone is capable of effectively separating most of the large sized silicon carbide particles. An advantage of removing the large silicon carbide particles before the high-temperature reaction steps is that less heat input is required for the overall process.

In an alternative embodiment, if a spent slurry entering the process description above is already in a dry condition and mostly free of the liquid phase, a liquid with low oxygen concentration and mechanical stirring devices may be used to create the slurry that is treated according to the methods previously described.

Alternative Inputs

In yet another alternative embodiment, the input raw material may be the waste from a slurry recovery process, wherein the composition is mostly devoid of large silicon carbide particles. This material may contain large amounts of steel and silicon along with small amounts of small-diameter silicon carbide particles and glycol, water or oil. This raw material would be treated according to the methods described herein, however, in most cases the removal of the large particle silicon carbide fraction is not required.

Methods and Systems for Recovery of Silicon and a Wafer-Saw Cutting Fluid

FIG. 1 illustrates a schematic diagram of the flow of materials for the commercial production of silicon and recovery of silicon carbide from a spent wafer cutting slurry of an apparatus. It shall be understood that any one or more of the processes shown in FIG. 1 can be implemented in any order and combinations thereof. Referring generally to the example methods, apparatus, and systems of FIG. 1, the spent slurry 1 from a wafer cutting operation is added to a stirred tank wherein a liquid solution containing water is added to create an appropriate viscosity for subsequent processing. Mechanical energy through stirring and/or vibration is used to adequately disperse particles in the stirred tank. The dispersed slurry is then transported to a high gradient magnetic separator or similar device that exploits substantial differences in the physical properties of the steel particles wherein the iron-containing particles are effectively removed and conducted to a waste recycle stream 2. The iron-free slurry 3 is then pumped into a liquid/solid separator. This unit may consist of a filter press, centrifuge, hydro-cyclone or other solid-liquid separation device that can operate with a particle size of between 1-20 micrometers.

As illustrated in the exemplary embodiment of FIG. 1, the liquid stream 4 passing through the liquid/solid separator is collected and later recombined with large silicon carbide particles to form a fresh wire-saw cutting fluid for the wafer cutting operation. The iron-free solid particles stream 5 obtained from the liquid/solid separator are conveyed via a screw feeder or similar device and dried by increasing the temperature and/or decreasing the pressure in this unit thereby volatilizing the remaining liquid phase. The collected liquid stream 6 is transported into a collection vessel and can later be recombined with large silicon carbide particles to form fresh wire-saw slurry for wafer cutting operations. The dried particles stream 7 consisting of silicon and silicon carbide is then injected into a gas-vapor stream through a pressure-scaled valve into Silicon Reactor 1. The gas-vapor stream typically consists of a carrier gas and silicon tetra-iodide in varying volume ratios. The residence time of the particles and vapor in this unit is generally less than 1 minute and the temperature is kept above about 1100° C., and preferably between 1250-1500° C.

Also in the example of FIG. 1, in Silicon Reactor 1 the silicon particles react completely to form silicon di-iodide in the gas-vapor phase. A cyclone or similar solid-gas separator can be added as part of this system and can allow for the capture and removal of silicon carbide particles in stream 8. The gas-vapor is transported via stream 9 to the entrance of Silicon Reactor 2 which consists of a fluidized bed or similar contacting device. The associated silicon carbide particles entering Reactor 1 do not generally react with silicon tetra-iodide. To avoid carry-over of silicon carbide particles into stream 9, a ceramic filter may also be added in-line to accomplish a final removal of this solid material.

As an example, the gas-vapor stream 9 is injected either into the dense phase of a fluidized bed (Silicon Reactor 2) or in the entrance to the distributor plate of said fluidized bed as illustrated in FIG. 1. Reactor 2 is maintained at a constant temperature throughout its volume in the range of 700-1000° C. In this example, the silicon di-iodide vapor is preferably deposited onto the particulate phase of the fluidized bed that consists of silicon seed material. As the bed particles of silicon grow into granules of about 0.5-10 millimeters (for example, 5 mm) they are removed from the bed by appropriate mechanical means and enter stream 11. The silicon granules are then cooled down to room temperature and form the saleable product. The gas-vapor phase 10 that exits the fluidized bed can be recycled back to Silicon Reactor 1. After many operation cycles of this type there can be a tendency for impurity buildup in the gas-vapor phase; therefore, some of the recycle stream 10 can be sent to a purification unit that performs distillation and/or solvent extraction of the impurities in the silicon tetra-iodide.

Methods and Systems with Reduced Heat Demand

Figure 2:
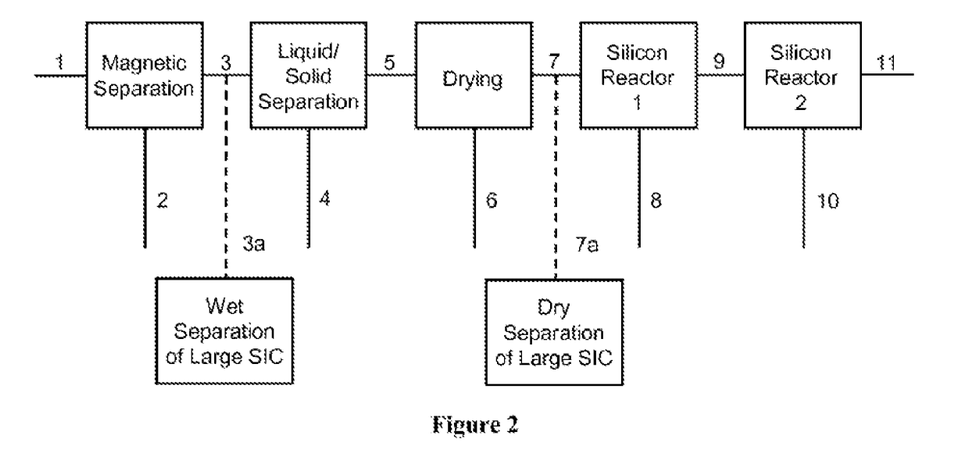
FIG. 2 is a schematic diagram of the apparatus illustrating how large silicon carbide particles can be recovered in a discrete step within the process described in FIG. 1.

Another exemplary embodiment of the invention as shown in FIG. 2 illustrates the flow of materials for the recovery of large silicon carbide particles from a process, such as the process previously described. FIG. 2 shows an exemplary variation of the process that is designed to improve or reduce the heat requirements. As silicon carbide particles participate in the Silicon Reactor 1 shown in FIG. 1, there can be a greater demand for heat as these particles are brought to the operating temperatures of 1100-1500° C. Furthermore, since the silicon carbide does not measurably react with the silicon tetra-iodide vapor then it effectively acts as a "dead-load" in this unit. The modifications to FIG. 1 shown in streams 3a and 7a can be used to effectively reduce the heat demand on the process, if required.

In stream 3a a majority of the large silicon carbide particles are removed with a hydrocyclone while in stream 7a in these particles are removed with an air-cyclone. Either of the cyclone systems can be effective although the air-cyclone may be more efficient at removing very small particles due to the larger density difference between fluid and particles.

Example 1

Two replicate experiments were performed in a bench-scale process system. The conditions used with apparatus (Reactor 1 and Reactor 2) in FIGS. 1 and 2 for Runs S1-31-08-11-14 and S1-31-08-12-05 are list in Table 1 below.

TABLE 1

|  | Run S1-31-08-11-14 | Run S1-31-08-12-05 |
|---|---|---|
| Raw materials used in SiI4 production | High purity iodine and silicon wafer pieces | High purity iodine and silicon wafer pieces |
| Si Source material (Reactor 1) | Treated industrial kerf beads | Treated industrial kerf beads |
| Deposition zone bed material (Reactor 2) | Quartz slides | Quartz slides |
| Reactor 1 (° C.) | 1200 | 1200 |
| Reactor 2 (° C.) | 900 | 900 |
| Carrier gas | Argon | Argon |

Kerf raw material from an industrial source was subjected to a series of steps including magnetic separation, leaching, solid/liquid separation, and drying. Table 2 shows a comparison of the composition difference between Stream 1 and 7 in FIG. 1 using GDMS analysis. The Boron and Phosphorous composition of silicon product is given in Table 3. Finally, a representative sample of the shape and size of silicon granules for run S1-31-08-12-05 is shown in FIG. 3.

TABLE 2

| Element | Stream 1 Concentration [ppm wt] | Stream 7 Concentration [ppm wt] |
|---|---|---|
| B | 2.5 | 1.5 |
| P | 16 | 5.9 |
| Fe | ~0.4 wt % | 240 |
| Co | 0.49 | 0.28 |
| Ni | 20 | 12 |
| Cu | 100 | 3 |
| Zn | 60 | 0.4 |
| As | 0.36 | 0.2 |
| Zr | 12 | 9 |
| Mo | 1.7 | 0.82 |

TABLE 3

|  | Run S1-31-08-11-14 | Run S1-31-08-12-05 |
|---|---|---|
| Boron (ppmw) | 0.40 | 0.45 |
| Phosphorous (ppmw) | 0.26 | 0.57 |

Methods and Systems for Recovery of High-Purity Silicon

FIG. 3 illustrates a schematic diagram of the flow of materials for recovery of silicon, silicon carbide and/or polyethylene glycol (PEG) from a spent wafer cutting slurry and production of high purity silicon. The steps shown in FIG. 3 include solid-liquid separation, magnetic separation, filtration, leaching, drying, Reactor 1 (which can be reaction with iodine), distillation, and Reactor 2 (which can be deposition). One or more of the steps may be used in the separation process. The order of separation processes do not necessarily have to be in the order shown in FIG. 3. The separation processes can be in any order. For example, a magnetic separation step can be before or after a solid-liquid separation step. The separation processes can be supplemented by additional separation processes known to one skilled in the art and/or one or more of the separation processes can be omitted.

Referring generally to FIG. 3, the spent slurry 1 from a wafer cutting operation may be added to a solid-liquid separator or series of separators. An additional liquid or separating agent 2 can be PEG, a liquid matching that of the input slurry, or any other liquid or slurry can be added to optimize, increase, or decrease the percent solids of the input slurry. The percent of solids in the spent slurry can be raised or lowered to affect the separation rate or efficiency of the solid-liquid separator or other separation steps. The input spent kerf slurry 1 that enters this process stage can have the following composition: about 40% PEG, about 50% SiC fines (about 5-30 μm), about 5% steel fines (about 0.1-5 μm), and about 5% silicon tines (about 0.1-5 μm). The solids can contain about 80% SiC (quasi-Gaussian particle size distribution (psd) with a volume arithmetic mean of about 10 μm and standard deviation of about 5 μm), about 5-10% brass-coated steel particles (irregular psd; about 0.1-2 μm effective diameter); and about 10-15% silicon particles (irregular psd; about 0.1-2 μm effective diameter).

An objective for this process stage. i.e. the solid-liquid separation, can be to remove as much of the SiC particles as possible without losing substantial amounts of Si. At least two types of technologies can achieve or approach this goal: (a) settling technologies using primarily gravity (advanced classifier; thickener) or centrifugal force (hydrocyclone, centrifuge); and (b) filtration using filters (not with screens or cross-flow units). The settling and filtration steps may be used in tandem to achieve the separation goal. The targeted output may be a slurry that contains about 10-20 wt % solids with solids composition of approximately 20 wt % SiC (psd; about <7 μm diameter), 20-30 wt % steel ((psd; about 0.1-2 μm diameter), and 50-60 wt % silicon ((psd; about 0.1-2 μm diameter), Centrifuges can be used to separate SiC using methods known to one skilled in the art. Generally, methods have been developed to recover as much SiC as possible without regard to any entrainment of Si. Any Si or steel that ends up in the product may he leached with acids and/or bases to remove these "contaminants" in the recycle stream of SiC. Thus there has not been a concerted effort to optimize the recovery of both SiC and Si. However, a centrifuging step to separate SiC may be incorporated into a process that may provide for recovery of both SiC and Si. The methods and apparatus of the present invention provide for the recovery of both SiC and Si.

With regard to settling methods, Stokes' Law indicates that the terminal velocity of a particle in a fluid is proportional to $d^2$, where d is the effective particle diameter, and $1/\mu$, where $\mu$ is the liquid viscosity. This means that the SiC particles (50% of the total) of $\geq 10$ μm may have terminal velocities that are between 50-400 times larger than those of steel and Si particles. This advantage may be somewhat diminished by the fact that the viscosity of a PEG solution is about 50 times greater than water. Hence, even though very good particle separation can be obtained, the process time may be too slow for commercial use. In some embodiments of the invention, ultrasound or ultrasonic frequencies can be used or applied to the separator to reduce settling times. Other additional vibrational energy can be used to facilitate separation of SiC particles from other particles. For example, the solution containing SiC and PEG can be heated to reduce the viscosity of the solution, thus reducing the settling time or increasing the terminal velocity of settling particles.

Referring to FIG. 3, the products from this process stage, i.e., solid-liquid separation, are SiC-enriched slurry 3, and a SiC-depleted slurry 4. Uses for the SiC-enriched shiny are discussed in greater detail below. The SiC-depleted slurry 4 may then be transported to a magnetic separator or a similar device that can exploit substantial differences in the magnetic susceptibility or magnetic properties of the steel particles where the iron-containing particles may be effectively or substantially removed and conducted to a waste recycle stream 6. The SiC-depleted slurry can have about 5-10% (total solid mass basis) of SiC.

The solids content in this stage, i.e., magnetic separation, may be adjusted by adding 5 PEG or liquid matching the slurry liquid so that an acceptable separation (i.e., >90%) of steel is achieved. Stream 6 can then be subjected to a controlled oxidation by dilution in water to produce hydrogen gas. This gas can be stored or flared or burned for production of energy to the plant. Alternatively, the hydrogen gas can be supplied to a fuel cell to generate electricity. The electricity can be used by the plant, stored, or transferred. Any silicon particles entrained in stream 6 can be recovered by leaching of the remaining steel in an aqueous solution with organic and/or inorganic acids. Economic considerations can determine if this practice is utilized.

The magnetic separation step may also yield silicon-rich slurry. The silicon-rich slurry 7 is transported into a filtration stage wherein 85-90% of the PEG can be removed in stream 9 without significant Si loss. Cake filters with pore sizes of <1 µm can be used. Other types of filters known or later developed in the art, such as rotary drum filters and/or pressure filters, can be used. PEG that passes through the filters can form stream 9. Washing fluid 8 may be added to adjust the cake properties to enhance separation efficiencies. Examples of washing fluids can include distilled deionized water and/or organic liquids, e.g., isopropyl alcohol. The output stream 10 from the filtration step can be rich in Si and substantively depicted of steel.

As illustrated in the exemplary embodiment of FIG. 3, the liquid stream 3 passing through the liquid/solid separator, which can be SiC rich, can be collected and later recombined with filtrate 9, which can be a PEG solution, to form wire-saw cutting slurry for the wafer cutting operation. Alternatively, liquid stream 3 can be further purified to increase the purity of the SIC and/or filtrate 9 can be further purified to increase the purity of the PEG solution prior to being combined. The combined PEG solution and SiC particles can be recycled to a wafer cutting device.

Referring to FIG. 3, further removal of the steel in stream 10 may be achieved by subjecting the solids therein to an acid leaching stage using inorganic and/or organic acids of appropriate concentration delivered by stream 11. Examples of acids that can be used include HCl with a calcium chloride catalyst, $HNO_3$, $H_2SO_4$, and oxalic acid. A liquor stream 12 containing soluble, steel contaminants can be discarded and a solids-rich stream 13 can he pumped to a drying stage. Alternatively, the acids in the liquor stream can be neutralized or reacted to form useful products. Solids can be precipitated from the liquor stream 12, gathered, and sold as scrap metal to steel mini mills. In this stage, i.e., drying stage, the slurry can be first filtered and then vacuum dried at elevated temperature with a gas, e.g., an inert gas like argon or hydrogen, blanket flow 14. The drying stage can be maintained at a temperature up to about 400° C., greater than about 400° C., at least about 200° C., or at least about 300° C. The dried slurry can become dried particles and exit the dryer through stream 16. The off gas 15 can contain moisture from the slurry.

The dried particles stream 16, which can include mostly silicon with small amounts of silicon carbide and steel, can then be injected into a gas-vapor stream through a pressure-scaled valve into Reactor 1. In some embodiments of the invention, stream 16 can be processed by a dry cyclone to remove solid silicon carbide or other solid materials.

Alternatively, stream 16 entering Reactor 1 can be metallurgical grade silicon. For instance, a stream 16 may be provided with silicon and other components that may or may not have undergone the previous steps. For example, any silicon with impurities may be provided to Reactor 1. The metallurgical grade silicon can be pulverized or ground to a particle size to increase the effective surface area for reactions in Reactor 1.

Referring generally to FIG. 3, the dried particle stream or metallurgical grade silicon 16 can be reacted with a gas-vapor stream 17 in Reactor 1. Gas-vapor stream 17 can include a carrier gas and iodine in varying volume ratios. Reactor 1 can be any type of dilute-phase reactor, such as for example a Fast Fluidized Bed (FFBR), preferably. The FFBR can contain a mixture of solids—inert particles of a specific size plus the injected stream 16. The velocity of gas-vapor 17 can be adjusted to ensure that the inert particles circulate as they arc carried up the vertical tube section, pass through the attached cyclone and return to the distributor plate of the FFBR. The residence time of the particle stream 16 can be determined by the efficiency of the cyclone and it is generally known that some smaller particles (e.g., about <1 µm) may be transported past the cyclone. These very small particles can be trapped in a filter consisting of either an electrostatic precipitator or porous solid-gas ceramic filter with average pore size less than about 1 µm. The temperature of Reactor 1 can be generally kept between about 600-900° C. Alternatively, the reactor can be maintained at higher temperatures or cycled through high temperatures.

In this manner, most of the iodine can be reacted with silicon to produce silicon tetra-iodide ($SiI_4$) or silicon di-iodide ($SiI_2$). In some embodiments of the invention, the reaction conditions can be such that the majority of the silicon iodides arc in the form of silicon tetra-iodide. In some embodiments of the invention, the reaction conditions in Reactor 1 can be such that up to about, about, or greater than about 10, 30, 50, 70, 90, 95, or 99% of the silicon iodides in the product stream are in the form of silicon tetra-iodide. Referring to FIG. 3, any impurities in the stream 16 can either be convened to their corresponding iodide vapor or compounds of silicon, e.g., iron-silicide. The silicides and other compounds of silicon can be retained in the FFBR and grow in size and may need to be withdrawn after a convenient time as shown by stream 18. The silicides and other compounds of silicon can be withdrawn continuously or periodically. The corresponding iodide vapors are transported along with $SiI_4$ to the next process stage via stream 19. The process stream 19 can contain un-reacted iodine vapor, $SiI_4$, impurity iodide vapors and some inert gas.

A distillation step may be provided for improving the purity of process stream 19. The distillation step can be prior to a deposition step for forming deposited silicon from a stream containing silicon iodides. For example, the process stream mixture 19 can be distilled in a continuous fashion in a column with sufficient theoretical plates to remove iodide and low boiling point impurity iodides (such as $BI_3$) at the reflux end of the column and higher boiling point iodides (such as $AlI_3$) at the re-boiler. $SiI_4$ can be recovered between those two levels of the column. The column many have any number of levels, stages, or plates for the purification of the $SiI_4$. The column may have one or more recycle streams to improve the efficiency of the separation process. Additional distillation columns and/or any other distillation devices, e.g., vapor compression distillation devices, known in the art may be used may also be used to further purify the $SiI_4$. Stream 20 and/or the column can be preferably operated in a vacuum or low-pressure mode that reduces overall temperature and heat requirements and thus can lead to less corrosion of the column internals. Stream 20 can carry an inert gas that assists with mixing within the column. The pressure in the distillation column can be less than about 101.3 kPa (1 atm), 75, kPa, 50 kPa, 25 kPa, or 5 kPa. The distillation column can be a tray distillation column, a packed distillation column, a vapor-compression distillation column or any other type of distillation column known to one skilled in the art.

The impurity iodides can be removed through stream 21 and processed in any manner known or later developed in the art. For instance, the impurity iodides may be processed according to the methods, devices and systems described in U.S. Provisional Patent Application No. 61/044,342 and U.S. Patent Publication No. 20080044337, each incorporated herein by reference in their entirety.

In addition to distillation, stream 19, carrying $SiI_4$, can be purified using vapor stripping and/or crystallization. Vapor stripping can be performed by mixing an inert gas with liquid SiIo such that light iodides like boron iodide can be removed by the inert gas stream. Crystallization can be performed by mixing the liquid $SiI_4$ with an organic liquid, such that the $SiI_4$ precipitates in the form of crystals. Seed crystals may be used. The additional processes, e.g., vapor stripping and/or crystallization, can be performed before or after the distillation process.

The distillation and/or other processes may yield a gas-vapor stream 22 comprising purified $SiI_4$. The purified $SiI_4$ stream can have a purity of at least 7N, 8N, 9N, 10N, 11N, or greater. The purified $SiI_4$ in gas-vapor stream 22 can be injected either into the dense phase of a fluidized bed (Reactor 2) or in the entrance to the distributor plate of said fluidized bed as illustrated in FIG. 3. Reactor 2 can be maintained at a temperature throughout its volume in the range of between about 900-1300° C. and at substantially less than atmospheric pressure. Examples of fluidized bed reactors include those described in U.S. Pat. No. 4,444,811, incorporated herein by reference in its entirety. The fluidized bed reactor for silicon deposition can be a bubbling or spouted-bed type fluidized bed reactor.

The purified $SiI_4$ may react to form $SiI_2$ (silicon di-iodide) which then breaks down into a solid silicon atom and an iodine vapor molecule ($I_2$) in Reactor 2. In this example, the solid silicon maybe preferably deposited onto the particulate phase of the fluidized bed that may consist of a silicon seed material. As the bed particles of silicon grow into granules of a desired size, e.g., about 0.5-10 millimeters or about 2 mm), they can be removed from the bed by appropriate mechanical means and enter stream 24. The silicon granules are then cooled down to room temperature and form the saleable product. A gas-vapor phase 23 may exit the fluidized bed and may consist of mostly iodine, un-reacted $SiI_4$ and inert gas. After suitable conditioning the iodine can be recycled back to Reactor 1 and $SiI_4$ may be recycled back to the distillation process, or to Reactor 2. The recycled $SiI_4$ can increase the amount of silicon that can be deposited in Reactor 2.

It shall be understood that the reactors or vessels provided in accordance with the invention including those for cyclone and fluidized bed vessel can be made of construction material typically composed of an outer metal alloy shell that provides structural strength and an inner ceramic shell that is exposed to the bed particles that is resistant to high temperature corrosion by the halogen-bearing vapors contained therein.

The methods, systems, and apparatus described herein can be employed in either continuous, semi-continuous, batch, or fed-batch modes. In some embodiments of the invention, some of the processes are batch and others are continuous mode. For example, the separation steps used for the production of the silicon-rich stream can be performed in a batch-wise manner and the steps for producing deposited silicon from the silicon-rich stream can be performed in semi-continuous manner.

The foregoing is considered as illustrative only of the principal or the invention. It shall be understood that the concepts of the invention herein may be applied to known silicon processing or recovery systems including but not limited to any of the following, which are hereby incorporated by reference in their entirety: pending U.S. patent application Ser. No. 11/893,980 (Fallavollita), now published as US Patent Publication No. 20080044337; U.S. Pat. No. 3,006,737 to Moates et al; U.S. Pat. No. 3,020,129 to Herrick; U.S. Pat. No. 4,388,080 to Kapur et al.; U.S. Pat. No. 4,388,286 to Kapur et al.; U.S. Pat. No. 4,910,163 to Jain; U.S. Pat. No. 5,772,900 to Yorita et al.; U.S. Pat. No. 6,113,473 to Costantini et al.; U.S. Pat. No. 6,231,628 to Zavattari et al.; U.S. Pat. No. 6,281,098 to Wang et al.; U.S. Pat. No. 6,322,710 to Katsumata et al.; WO 00-01519 to Zavattari et al.; WO2002 040407 to Henriksen; U.S. Pat. No. 6,615,817 to Horio; U.S. Pat. No. 6,780,665 to Billiet et al.; U.S. Pat. No. 6,929,537 to Kajimoto; U.S. Pat. No. 6,838,047 to Billiet et al.; WO 2006-137098 to Frangiacomo; and U.S. Pat. No. 7,223,344 to Zavattari et al. Further, since numerous modifications and changes will occur to those persons skilled in the art, it is not desired to limit the invention to the exact construction and operation shown and described, and accordingly all suitable modifications and equivalents may be resorted to falling within the scope of the invention as defined by the claims which follow.

What is claimed is:

1. A method for recovering silicon from silicon saw kerf, comprising:
   a) removing iron-containing particles from a silicon saw kerf slurry, thereby producing a slurry product;
   b) removing liquid from said slurry product to produce a mixture of silicon carbide and silicon;
   c) providing said mixture and iodine to a first vessel to form a vapor comprising silicon tetra-iodide and/or silicon di-iodide in the first vessel;
   d) providing said vapor comprising silicon tetra-iodide and/or silicon di-iodide to a second vessel; and
   e) forming silicon and iodine ($I_2$) from the silicon tetra-iodide and/or silicon di-iodide in the second vessel.

2. The method of claim 1, wherein said silicon has a purity of at least about 99.9999%.

* * * * *